United States Patent
Wang et al.

(10) Patent No.: US 7,494,559 B2
(45) Date of Patent: Feb. 24, 2009

(54) SURFACE ORNAMENTATION METHOD OF COMPOSITE MATERIAL

(75) Inventors: Ching-Cheng Wang, Tao Yuan Shien (TW); Chao-Hung Lin, Hsinchuang (TW); Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 303 days.

(21) Appl. No.: 11/444,418

(22) Filed: Jun. 1, 2006

(65) Prior Publication Data

US 2007/0006966 A1   Jan. 11, 2007

(30) Foreign Application Priority Data

Jul. 6, 2005   (TW)   .............................. 94122916 A

(51) Int. Cl.
*B32B 37/00*   (2006.01)

(52) U.S. Cl. ..................... 156/245; 264/45.1; 264/45.4; 264/46.4

(58) Field of Classification Search ................. 156/245; 264/45.1, 45.4, 46.4, 259, 266, 241, 258; 428/31

See application file for complete search history.

(56) References Cited

U.S. PATENT DOCUMENTS 5,928,734 A    7/1999   Scherf
6,280,836 B1 *  8/2001   Hara et al. ............... 428/318.8

* cited by examiner

*Primary Examiner*—Jeff Aftergut
*Assistant Examiner*—Jaeyun Lee
(74) *Attorney, Agent, or Firm*—Rabin & Berdo, PC

(57) ABSTRACT

A printed plastic film is placed on a composite sheet material. Then, both of the printed plastic film and the composite sheet material are put in a mold. The mold is closed and heated to soften the composite sheet material, so that the composite sheet material and the printed plastic film can be attached together to form the product. After opening the mold, the product having an ornamental surface can be obtained.

10 Claims, 1 Drawing Sheet

SURFACE ORNAMENTATION METHOD OF COMPOSITE MATERIAL

RELATED APPLICATIONS

The present application is based on, and claims priority from, Taiwan Application Serial Number 94122916, filed Jul. 6, 2005, the disclosure of which is hereby incorporated by reference herein in its entirety.

BACKGROUND OF THE INVENTION

1. Field of Invention

The present invention relates to a technique of surface ornamentation. More particularly, the present invention relates to a surface ornamentation method for composite material.

2. Description of Related Art

Precision electronic components in mobile electronic devices have to be well protected by plastic shells made by strong and light materials to facilitate the needs of mobile devices. Composite material, plastics matrix material mixed with and containing reinforcing fibers of short and long length, is one of the conventional fiber reinforced material usually used for producing plastic shells.

The process of using composite materials to produce plastic shells for mobile electronic products includes the following steps. A plastic material and fibers are mixed together to form a sheet of composite material. The composite material is then cut to the proper size. Next, the sheet of the composite material is placed in a mold to perform a mold-pressing process at high temperature and high pressure to obtain a material with desired three-dimensional shape. Finally, the mold is opened and the product is taken out.

An organic solvent is required to uniformly mix plastic material and fibers. If plastic material and fibers are not uniformly mixed, bubbles which cause surface defect can be easily formed in the mold-pressing step. Before paint is sprayed onto the surface of the shell product, the surface has to be polished in order to obtain a decent product, or the thickness of the paint can be increased to minimize the effect of defects on the surface.

However, the polishing process decreases product throughput and increases product price. Moreover, occupational injury is possible if powders generated in the polishing process are inhaled by operators. Besides, the increase of paint thickness on the shell surface cannot totally resolve the surface defect problem, and spraying thick paint also leads to low product yield.

SUMMARY OF THE INVENTION

In one aspect, the present invention provides a surface ornamentation method for composite material to solve the surface defect problem.

In accordance with the foregoing and other aspects of the present invention, a surface ornamentation method for composite material is provided. A composite sheet material having a desired three-dimensional shape is produced and then cut to a desired size. A plastic thin film having a desired pattern and the same desired three-dimensional shape is formed. Next, the plastic thin film is stacked over the composite sheet material, and both plastic thin film and composite sheet material are placed together in a mold. The mold is then closed to perform a molding step to have both plastic thin film and the composite sheet material attached together. A product of a composite sheet material having ornamental decoration is thus obtained.

According to a preferred embodiment, the molding step is performed at high temperature without applying any pressure. The heating method for the molding step is preferably applying infrared ray, which softens the composite sheet material.

In the foregoing, a plastic thin film having a desired pattern is used to decorate the surface of the composite sheet material, the surface defects of the composite sheet material are therefore covered and conventional problems can be avoided.

It is to be understood that both the foregoing general description and the following detailed description are made by use of examples and are intended to provide further explanation of the invention as claimed.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENTS

Figure 1:
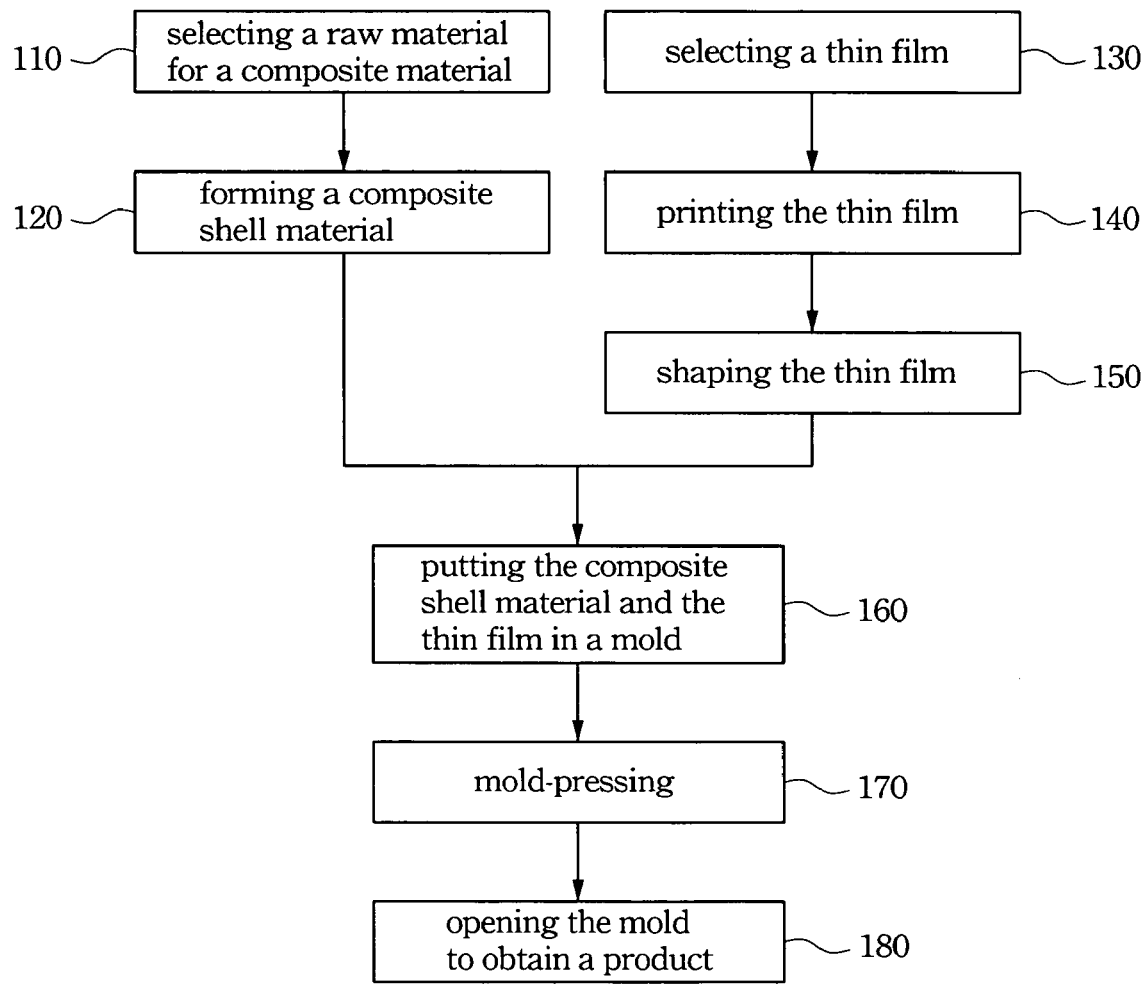
FIG. 1 is a flow chart showing a surface ornamentation process of a composite material according to one preferred embodiment of this invention.

Reference will now be made in detail to the present preferred embodiments of the invention, examples of which are illustrated in the accompanying drawings.

In-mold decoration (IMD) is a color decoration technique for plastic products. A transparent thin film is color-printed, hot-pressed, and then cut to form a colored thin film having desired pattern, shape and size. Next, the colored thin film is placed together with a plastic raw material in a mold, and both of them are injection molded and attached together. A plastic product with beautiful and colorful appearance is thus obtained. Hence, many plastic products which surface cannot be treated by color paints are usually able to use the IMD technique to decorate their appearances.

This invention modifies the IMD technique mentioned above to develop a surface ornamentation technique for composite materials to overcome the conventional problems as described above. FIG. 1 is a flow chart showing a surface ornamentation process for a composite material according to one preferred embodiment of this invention. In FIG. 1, a material and fibers for a composite material are selected in step 110. A molding step is performed after mixing the plastic material and fibers to form a composite sheet material having a desired three-dimensional shape in step 120. For composite materials used in mobile electronic products, polyethylene terephthalate (PET) or polymethyl methacrylate (PMMA) are usually selected as plastic material, and carbon fibers or glass fibers are usually selected as fiber material.

Next, a plastic thin film is selected in step 130. The plastic thin film is color printed by spraying paints to form a colored thin film in step 140 and then hot-pressed to obtain a conformal shape with the composite sheet material in step 150.

Then the colored thin film is stacked over the composite sheet material and both of them are put in a mold in step 160. The mold is then closed and heated to soften the composite sheet material in step 170. Hence, the composite sheet material and the color thin film can be molded and attached together. Preferably, the mold is a cold mold heated by infrared ray only without applying any pressure. That is, a heating system is not associated within the mold directly, so that the mold is not heated prior to applying the infrared ray. Finally, the mold is opened, and the final product is obtained in step 180.

Accordingly, a conventional IMD has been modified by the preferred embodiment of this invention. A mold is both heated and pressurized in a conventional IMD, but the mold is only heated in the preferred embodiment of this invention. The mold injection step in the conventional IMD is also omitted in the preferred embodiment of this invention.

The IMD technique has been modified to be applied on products made by composite materials. Hence, the products made by composite materials can have a high-quality and beautiful appearance, and the surface polishing and paint spraying steps, in prior arts, for products made by composite materials can be omitted. That is, the yield and throughput for products made by composite materials can be greatly increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A surface ornamentation method for composite materials, comprising the steps of:

forming a composite sheet material having a three-dimensional shape, wherein a plastic material of the composite sheet material comprises polyethylene terephthalate or polymethyl methacrylate;

cutting the composite sheet material;

forming a plastic thin film having a pattern and the three-dimensional shape;

cutting the plastic thin film;

stacking the plastic thin film over the composite sheet material;

putting the plastic thin film and the composite sheet material in a mold;

heating the mold to soften the composite material;

performing a molding step to completely attach the plastic thin film to the composite sheet material to obtain a product; and opening the mold to take out the product.

2. The method of claim 1, wherein the mold comprises a cold mold.

3. The method of claim 1, wherein the mold is heated by infrared ray.

4. The method of claim 1, wherein the molding step is performed without applying any pressure.

5. The method of claim 1, wherein fibers of the composite sheet material comprises carbon fibers or glass fibers.

6. A surface ornamentation method for composite materials, comprising the steps of:

forming a composite sheet material having a three-dimensional shape, wherein fibers of the composite sheet material comprises carbon fibers or glass fibers;

cutting the composite sheet material;

forming a plastic thin film having a pattern and the three-dimensional shape;

cutting the plastic thin film;

stacking the plastic thin film over the composite sheet material;

putting the plastic thin film and the composite sheet material in a mold;

heating the mold to soften the composite material;

performing a molding step to completely attach the plastic thin film to the composite sheet material to obtain a product; and opening the mold to take out the product.

7. The method of claim 6, wherein the mold is not preheated before the heating step.

8. The method of claim 6, wherein the mold is heated by infrared ray.

9. The method of claim 6, wherein the molding step is performed without applying any pressure.

10. The method of claim 6, wherein a plastic material of the composite sheet material comprises polyethylene terephthalate or polymethyl methacrylate.

\* \* \* \* \*